ADJUSTABLE EQUALIZER CIRCUIT FOR MAGNETIC REPRODUCER

Filed Nov. 16, 1964 Sheet 1 of 3

INVENTOR:
Richard V. Roelofs
By Keith D. Beecher
Attorney (Controllable Equalizer System)

INVENTOR:
Richard V. Roelofs
By Keith D. Beecher
Attorney

INVENTOR
Richard V. Roelofs
By Keith D Beecher
Attorney 3,436,490
Patented Apr. 1, 1969

3,436,490

ADJUSTABLE EQUALIZER CIRCUIT FOR MAGNETIC REPRODUCER

Richard V. Roelofs, Granada Hills, Calif., assignor, by mesne assignments, to United Control Corporation, Redmond, Wash., a corporation of Delaware Filed Nov. 16, 1964, Ser. No. 411,363
Int. Cl. G11b *5/00*
U.S. Cl. 179—100.2 8 Claims

ABSTRACT OF THE DISCLOSURE

A tape reproduce system having improved compensation for phase displacements. The system includes a reproduce head and an equalizer circuit having a delay circuit with a variable impedance coupled across the delay circuit for adjustably compensating for phase displacements of the high frequency signals from the reproduce head. The system of the invention produces an output signal having an essentially uniform high frequency response characteristic.

The present invention relates to an electronic system for reproducing the intelligence recorded on a magnetic tape, or the like, and it relates more particularly to an improved equalizer circuit for use in such a reproducing system.

Magnetic tape reproducing systems usually include a compensating electrical circuit which is generally referred to as an "equalizer circuit." This circuit compensates for the drop in response of the electromagnetic reproduce head at the high signal frequencies, due to aperture effects in the head, so as to provide desired wide band response characteristics in the reproduce system.

The usual prior art equalizer circuit provides high frequency emphasis, and as noted above, it serves to compensate for the inherent loss in response of the electromagnetic reproduce head at the high frequency end of the reproduce frequency range, due to aperture effects in the head.

As is well known, the response of the usual electromagnetic reproduce head falls off at the higher signal frequencies due to the finite length of the air gap in the magnetic circuit of the head, and also due to eddy current and other losses. The resultant response of the reproduce head is similar to that of a low pass filter.

Copending application Ser. No. 228,887, filed Oct. 8, 1962, in the name of Wayne R. Johnson, and assigned to the present assignee, now abandoned, discloses and claims an equalizer circuit which is capable of providing the desired high frequency emphasis so as to compensate for the aforesaid aperture effect losses inherent in the reproduce head.

Low frequency emphasis is also essential since the output from the reproduce head is proportional to the rate of change of the flux in the head ($d\phi/dt$). This means that there is an inherent decrease in the effective response of the reproduce head to the low signal frequencies. The equalizer circuit described in the copending application additionally provides both high and low frequency emphasis, so as to compensate further for the above-mentioned drop in response of the reproduce head at the lower signal frequencies.

The improved equalizer circuit of the present invention may incorporate the teachings of the aforesaid Johnson application to provide both high and low frequency emphasis to the signals from the aforesaid reproduce head.

It is well known that when complex signals are recorded on a magnetic tape, or the like, a phenomenon known as "envelope delay" is introduced. This phenomenon manifests itself in distorting phase shifts of the higher frequency components of the recorded information. Then, unless compensation is provided in the reproduce electronics, the outputs reproduced thereby will also exhibit corresponding phase distortions in its higher frequency components. The principal objective of the invention is to provide a circuit having the ability to impose a first order phase correction in order to minimize envelope delays.

The improved controllable equalizer circuit of the present invention corrects phase distortions in the reproduced information. It will be appreciated that the improved controllable equalizer circuit of the invention is capable of correcting such phase distortions which arise due to the aforesaid record phenomenon, and also which arise prior to recording. The latter distortions may occur, for example, when the subsequently recorded information is received over a wireless link from an airborne, or other remote vehicle.

The controllable aspect of the improved equalizer circuit of the invention permits the aforesaid phase distortions to be corrected for any particular recording on the tape to be reproduced. It will be appreciated that each particular recording on the different tapes to be reproduced by a typical system normally requires a different setting of the phase compensation in the equalizer circuit.

A primary object of the invention, therefore, is to provide an extremely simple equalizer circuit which is capable of correcting the above-mentioned aperture effect of the reproduce head, so as to provide an essentially uniform high frequency response characteristic and to provide an adjustable phase response so that phase distortions in the high frequency components of the reproduced signals may be compensated.

Other objects and advantages of the invention will become apparent from a consideration of the accompanying drawings, in which.

As is well known, the reduction in the amplitude of the signal reproduced by a typical electromagnetic reproduce head, due to the aforesaid aperture effect, may be expressed by the equation:

$$\text{Gap loss} = 20 \log \left[ \frac{\sin \frac{\pi l}{\lambda}}{\frac{\pi l}{\lambda}} \right] db \qquad (1)$$

Figure 1:
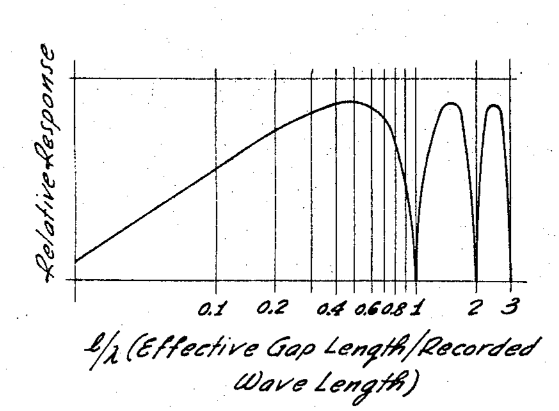
FIGURE 1 is a curve representing the response of a typical electromagnetic reproduce head.

The relationship between gap response and $1/\lambda$ is shown by the curve of FIGURE 1. The usual prior art equalizer circuit serves to emphasize the high frequency response of the reproduce head so as to compensate for the high frequency aperture effect drop-off exhibited by the curve of FIGURE 1. As mentioned above, the equalizer circuit described and claimed in the aforesaid copending application additionally serves to emphasize the low frequency response of the head, so that an essential flat response characteristic is exhibited over a wide frequency range.

The improved equalizer circuit of the present invention, as mentioned above, additionally provides a controllable phase response for the equalizer so as to compensate for phase distortion in the high frequency components of the reproduced signals.

The embodiment of the invention to be described uses a potentiometer for variable phase adjustment. This potentiometer bridges the input and output of a center tapped and terminated delay line. The resulting output of the delay line is applied through a particular coupling circuit to a differential amplifier, as will be described, so as to achieve the desired adjustable phase and amplitude compensations.

Figure 2:
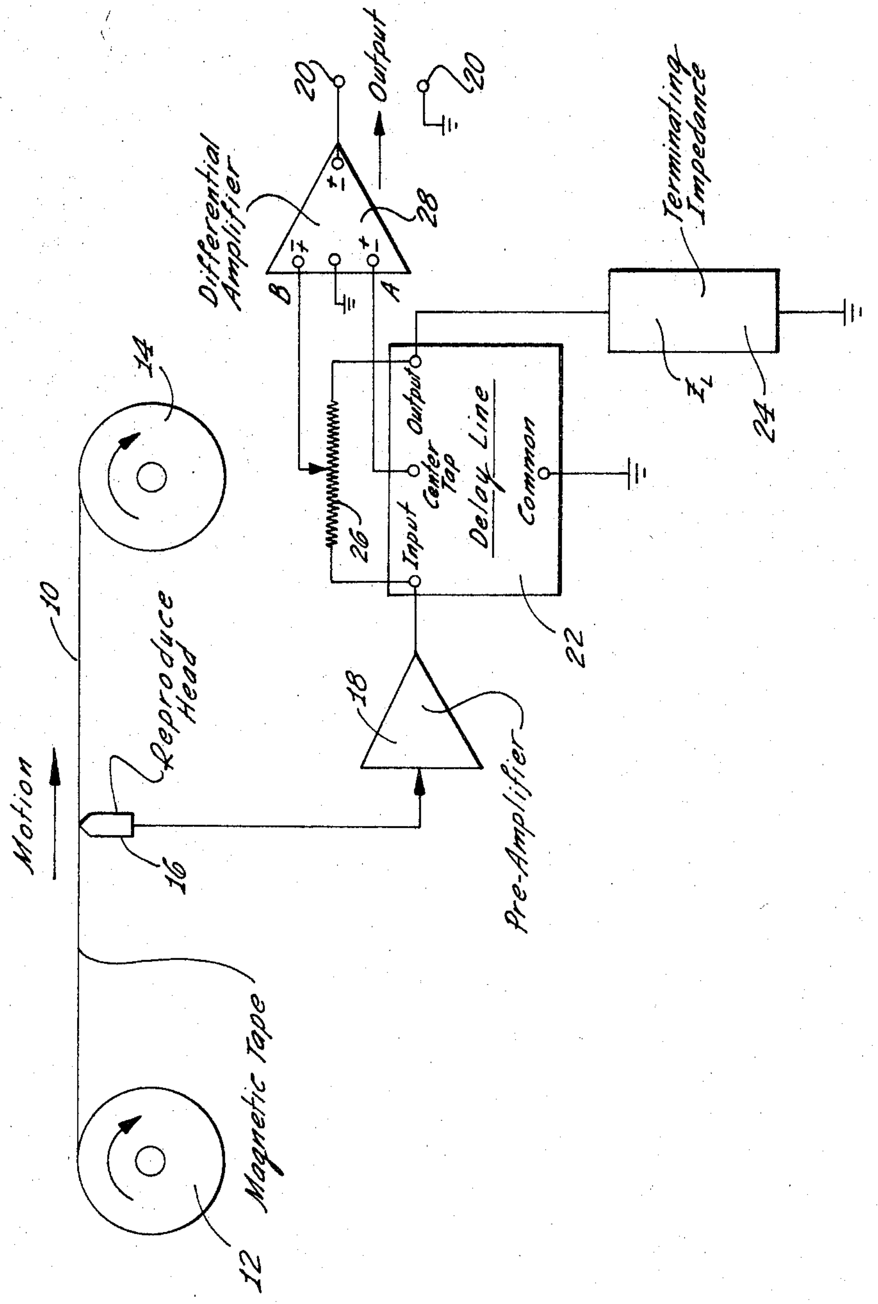
FIGURE 2 is a schematic diagram of an equalizer circuit constructed in accordance with one embodiment of the invention.

The system of FIGURE 2 is one in which the equalizer circuit of the present invention is used in conjunction with the reproduce electronics of a magnetic tape recorder/reproducer system.

The system of FIGURE 2 includes, for example, a magnetic tape 10 which is drawn by any appropriate means from a pay-out reel 12 to a take-up reel 14. An electromagnetic transducer, or reproduce head 16, is positioned to be magnetically coupled to the tape, so that the intelligence recorded on the tape may be sensed by the head. The head serves to convert the magnetically recorded intelligence into electrical signals. These signals are introduced to a pre-amplifier 18 in which they are amplified. The pre-amplifier 18 also preferably provides low frequency equalization for a particular tape speed, for example, for a tape speed of 7½ inches per second.

As mentioned above, the response characteristic of the reproduce head 16 drops off at the high frequency end of the range of signals sensed thereby, due to the aforesaid aperture effect and other losses. Also, and as also mentioned, the response characteristic of the reproduce head 16 decreases towards the low end of the range, this being because the head responds to the rate of change of the flux ($d\phi/dt$) in its magnetic circuit. The pre-amplifier takes care of the low frequency drop in response, to some extent.

An equalizer circuit, embodying the concepts of the invention, is interposed between the pre-amplifier 18 and the output terminals 20. This equalizer circuit serves to compensate the high frequency drop-off of the response characteristic of the reproduce head. Moreover, and as mentioned above, the equalizer circuit may serve to incorporate the teachings of the aforesaid copending application, so as to assist the pre-amplifier in providing a compensating emphasis at the low frequency end of the band.

The important feature of the equalizer circuit of the invention is that means is provided for adjustably compensating for phase displacements of the high frequency components of the signals reproduced by the head; which phase displacements, as described above, produce distortions in the reproduction of the signals.

The equalizer circuit of FIGURE 2 includes a delay line 22, the common terminal of which is grounded. The pre-amplifier 18 is connected to the input terminal of the delay line, and the output terminal is connected to a grounded terminating impedance 24, designated $Z_L$. Both the delay line itself and the pre-amplifier may be of any known and suitable construction.

A voltage divider, in the form of an impedance, which may, for example, be a potentiometer 26, is shunted across the delay line between the input and output terminals. The movable arm of the potentiometer is connected to an input terminal B of a differential amplifier 28, and the center tap of the delay line is connected to the second input terminal A of the differential amplifier. The output of the differential amplifier is applied to the output terminals 20. The potentiometer may be manually controlled, or it may be servo controlled when an automatic control is desired, for example.

The delay line 22, for example, has a full-wave electrical length at a wavelength corresponding to the high frequency end of the pass band of the reproducing system.

The impedance of the delay line $Z_0$ as seen from the output terminal is preferably made equal to the terminating impedance $Z_L$. Moreover, the resistance of the potentiometer 26 is greater than, for example, 100 times the impedance of the delay line.

The use of delay lines, such as the delay line 22 in an equalizer circuit, for emphasizing high frequency components, is discussed, for example, at page 16–118 (FIGURE 16–129) of "Television Engineering Handbook" by Donald G. Fink, First Edition, 1957. The equalizer circuit of the present invention is predicated upon the similar principles, and utilizes the potentiometer 26 to provide a desired phase adjustment for the high frequency components of the signal reproduced by the system.

Figure 3:
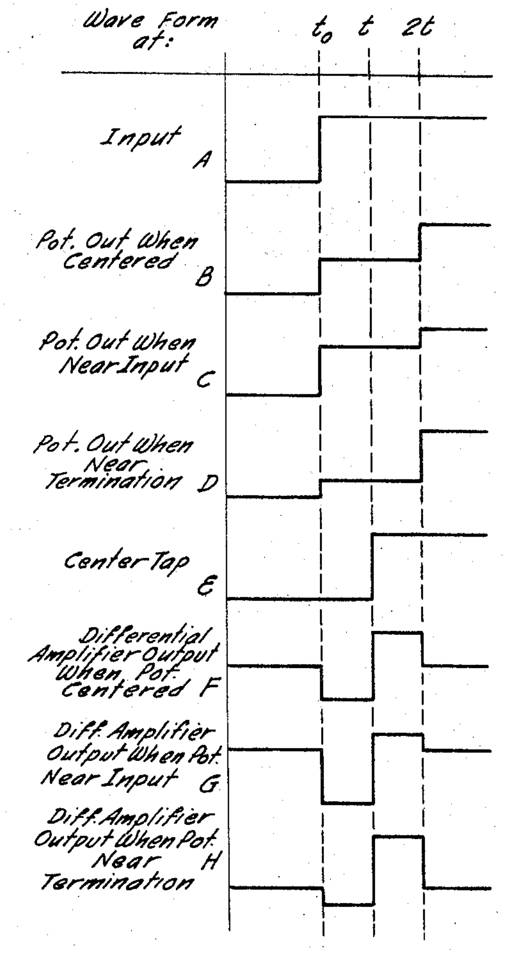
FIGURE 3 is a set of curves useful in explaining the operation of the equalizer circuit of FIGURE 2.

The operation of the circuit can best be understood by assuming that the pre-amplifier 18 applies a step function signal to the input terminal of the delay line, and with reference to the curves of FIGURE 3. Assume first that the movable arm of the potentiometer 26 is centered. Then, the step function applied at "$t_0$" time to the input terminal of the delay line 22 (curve A) will cause a signal to appear at the movable arm of the potentiometer 26.

Therefore, the signal appearing at the movable arm of the potentiometer 26, and applied to the input terminal B of the differential amplifier 28, is as shown in the curve B. That is, during the forward motion of the signal down the delay line 22, the potentiometer 26 serves as a voltage divider, so that the signal applied to the input terminal B at time "$t$" has half the amplitude of the input signal.

At "$2t$" time, however, the signal reaches the output terminal of the delay line and appears across the terminating impedance 24 ($Z_L$). The delayed step function is then attenuated by the potentiometer 26 now serving as a voltage divider to the delay line output terminal. The signal added to the orginal at "$2t$" time causes the signal appearing at the movable arm of the potentiometer to increase in amplitude at time "$2t$," as shown by the curve B, so as to approximate the amplitude of the original step function input signal.

The curves C and D of FIGURE 3 illustrate how the amplitude of the summed wave applied by the potentiometer 26 to the input terminal B of the differential amplifier 28 can be changed by moving the movable arm of the potentiometer nearer the input terminal (curve C), or nearer the output terminal (curve D).

The curve E of FIGURE 3 shows the signal appearing at the center tap of the delay line. This signal, of course, steps in correspondence to the step function at time "$t$." The signal at the center tap is applied to the input terminal A of the differential amplifier 28.

The signal applied to the input terminal A of the differential amplifier 28 is translated to the output terminal without phase reversal. The signal applied to the input terminal B, however, is translated to the output terminal with inverted phase to be subtracted from the signal applied to the input terminal A.

Therefore, when the movable wiper arm of the potentiometer 26 is centered, the output from the differential amplifier has the form shown in the curve F of FIGURE 3. Likewise, when the movable arm of the potentiometer is moved nearer the input terminal, the output from the differential amplifier 28 has the form shown in the curve G; and when the movable arm of the potentiometer is moved toward the output terminal, the output wave form from the differential amplifier has the form shown in the curve H.

It will be appreciated, therefore, that when a pure step function wave form is passed by the equalizer circuit shown in FIGURE 2, its leading and lagging edges will take on the shape shown in the curve F, G or H of FIGURE 3, depending upon the adjustment of the movable arm of the potentiometer 26. Therefore, when the step function has a rounded configuration, due to the falling off of high frequency response in the reproduce head, the effect of the wave forms described above is to sharpen the leading and lagging edges of the step function at the output terminals, and effectively emphasize the attenuated high frequency components.

The potentiometer 26, therefore, serves as a mixer for the input and output of the delay line 22, and it applies the mixed signals to the differential amplifier. This signal, in conjunction with the signal at the center tap of the delay line cooperate in the differential amplifier so as to provide a first order phase correction, and thereby minimizes envelope delay encountered during or prior to the recording process.

It will be appreciated that the potentiometer 26 can be set appropriately for any recording to be reproduced by the system, so that the distorting effects of envelope delay may be compensated in an optimized manner for each particular recording. This is essential, of course, since the envelope delay is most likely to vary from one recording to another.

Figure 4:
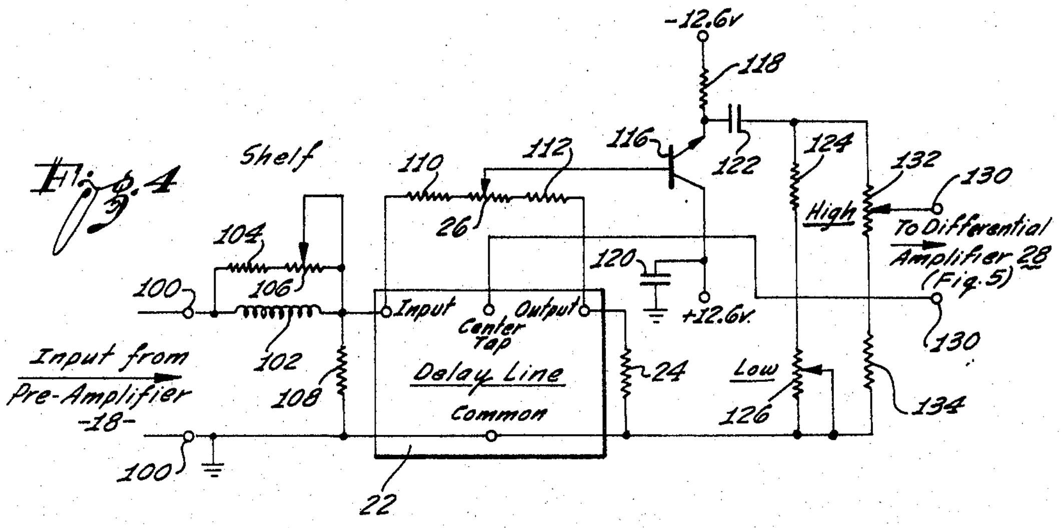
FIGURE 4 is a diagram, partly in circuit form, showing a portion of the equalizer circuit of FIGURE 2, in greater detail.

The equalizer circuit of the invention is shown in somewhat more detail in FIGURE 4, and the circuit of FIGURE 4 is also constructed to incorporate the circuitry described and claimed in the aforementioned copending application, for low frequency response emphasizing purposes.

In the circuit of FIGURE 4, a pair of input terminals 100 are provided. One of the input terminals is grounded, and the other is connected to an inductance coil 102. The inductance coil 102 is replaceable, and it may have different values, as given by the table below.

The inductance 102 is shunted by a resistor 104 and a potentiometer 106. The inductance coil 102, the resistor 104 and the potentiometer 106 may have different values, in accordance with the following table.

| Tape speed (inches/sec.) | Resistor 104 | Potentiometer 106 | Inductance coil 102 (millihenries) |
|---|---|---|---|
| 7½ | Omit | Omit | Omit |
| 15 | 120 | 1k. | 3.9 |
| 30 | 240 | 2.5k. | 3.9 |
| 60 | 470 | 5k. | 3.9 |
| 120 | 1k. | 5k. | 3.9 |
| 240 | 1.8k. | 5k. | 3.9 |

The inductance coil 102 is connected to a grounded resistor 108 ($Z_0$) which may, for example, have a resistance of 100 ohms. The junction of the resistor 108 and inductance coil 102 is connected to the input terminal of the delay line 22.

In the particular illustrated embodiment, for example, the circuit parameters are selected so that the pre-amplified and the delay line circuit cooperate to provide a desired uniform response over the desired frequency range at a tape speed, for example, of 7½ inches per second.

For that tape speed, therefore, the inductance coil 102, resistor 104 and potentiometer 106 are omitted, as indicated in the above table, and the ungrounded input terminal 100 in FIGURE 4 is directly connected to the input terminal of the delay line 22.

However, for higher tape speeds, and as indicated in the table, the aforesaid elements 102, 104 and 106 must be included in the circuit, with the values stated in the table, in order that the desired uniform response over the frequency range can be preserved.

The inductance coil 102 cooperates with the resistor 108 to provide an attenuation of the signal components of the signals passed by the pre-amplifier at the higher tape speeds, which attenuation increases with frequency. This attenuation serves to compensate for the change in response of the pre-amplifier 18 at the higher tape speeds. That is, the pre-amplifier 18 does not provide sufficient equalization for the high frequency components of the signals passed thereby at the higher tape speeds; and the inductance coil 102 provides the desired equalization.

However, for frequency components above a certain threshold, it is desirable that no further attenuation be provided by the inductance coil 102, since the response of the pre-amplifier falls off at such a threshold. At this threshold, the potentiometer 106 takes over, and imparts an adjustable "shelf" characteristic to the attenuation by the network 102, 104, 106.

In the circuit of FIGURE 4, a pair of resistors 110 and 112 are connected in circuit with the potentiometer 26.

The terminating impedance 24 ($Z_L$) in the circuit of FIGURE 4 is a 91 ohm resistor. The movable arm of the potentiometer 26 is connected to the base of an NPN transistor 116. The resistor 110 may have a resistance of 150 ohms, and the resistor 112 may have a resistance of 1 kilo-ohm.

The emitter of the transistor 116 is connected through a resistor 118 to the negative terminal of a 12.6 volt direct voltage source. This resistor, for example, may have a resistance of 1.2 kilo-ohms. The collector of the transistor is connected directly to the positive terminal of that source, which terminal is connected to a grounded by-passing capacitor 120. The latter capacitor may have a capacity, for example, of .005 microfarad.

The transistor 116 is connected as an emitter follower so as to constitute a constant voltage source for circuitry subsequently to be described. Its emitter is connected to a capacitor 122 which, in turn, is connected to a resistor 124, the resistor being connected to a grounded potentiometer 126. The capacitor 122 may have a capacity, for example, of 0.33 microfarad, the resistor 124 may have a resistance of 1.8 kilo-ohms, and the potentiometer 126 may have a resistance of 10 kilo-ohms.

Figure 5:
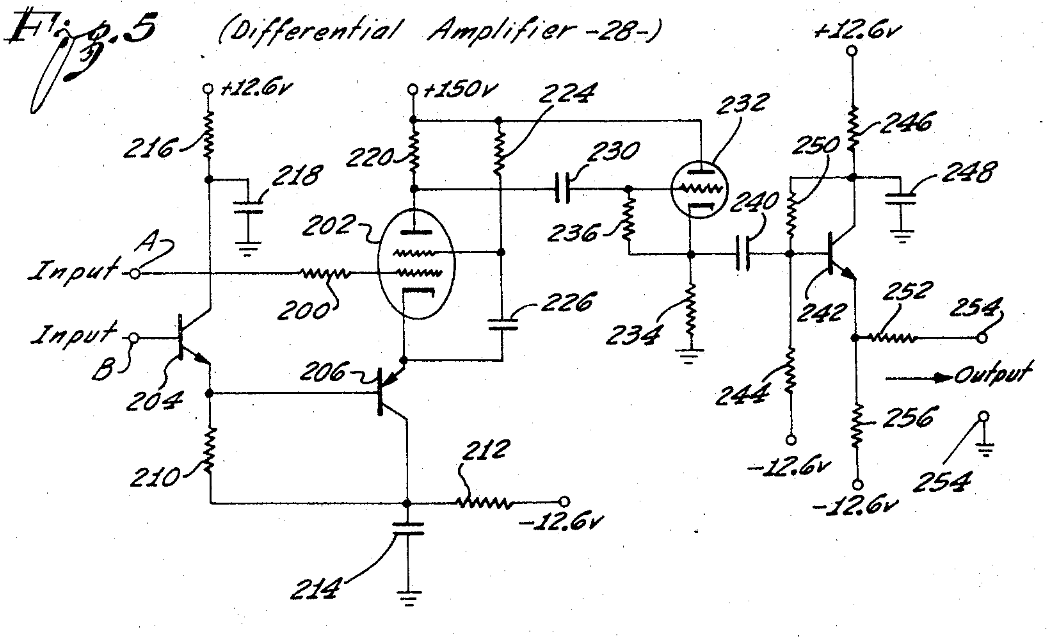
FIGURE 5 is a circuit diagram of a differential amplifier which may be included in the system of FIGURE 2.

The center tap of the delay line 22 is connected to one of the output terminals 130, that particular output terminal being connected to the input terminal A of the differential amplifier 28 shown in FIGURE 5. The other output terminal 130, which connects to the input terminal B of the differential amplifier, is connected to a movable arm of a potentiometer 132. The potentiometer 132 and a resistor 134 are connected across the elements 124 and 126. The potentiometer 132 may have a resistance, for example, of 5 kilo-ohms, and the resistor 134 may have a resistance of 4.7 kilo-ohms.

The capacitor 122, resistor 124 and potentiometer 126 function as a high-pass filter. This high-pass filter causes the response of the differential amplifier 28 to increase for signal frequencies at the lower frequency end of the band. This is because the high-pass filter formed by these elements tends to attenuate the low frequency signals, thereby unbalancing the differential amplifier and causing its response to very low frequency signals to increase.

The characteristics of the high-pass filter can be controlled by adjustment of the potentiometer 126, so that this potentiometer serves as an adjustment for the low frequency response of the system. Likewise, the potentiometer 132 controls the amplitude of the signal passed by the circuit to one of the input terminals of the differential amplifier, without affecting the amplitude of the signal applied to the other input terminal of the differential amplifier, and thereby controls the high frequency response of the system.

Therefore, the simple circuit of FIGURE 4 provides four controls for the signals passed by the equalizer circuit. These four controls may be adjusted for any particular recording so as to provide a wide-band high-fidelity reproduction of the recorded intelligence, with special adjustable compensation being provided for any envelope delay distortion which might have been encountered in the reproduced signals.

The differential amplifier 28, as shown in FIGURE 5, includes the input terminals designated A and B. The input terminal A is connected through a 100 ohm resistor 200 to the control grid of a discharge device such as a tetrode 202. The second input terminal B is connected to the base of an NPN transistor 204.

The transistor 204 may be of the type designated 2N1613. The emitter of the transistor is connected as a Darlington circuit, to the base of a PNP transistor 206 which may, for example, be of the type 2N1131. The emitter of the transistor 204 is also connected to a resistor 210 which may have a resistance, for example, of 10 kilo-ohms. The resistor 210 is connected through a resistor 212 to the negative terminal of the 12.6 volt source, the resistor 212 having a resistance, for example, of 100 ohms. The junction of the resistors 210 and 212 are also connected to a grounded by-passing capacitor 214. The capacitor 214 may have a capacity of .001 microfarad.

The collector of the transistor 204 is connected to the positive terminal of the 12.6 volt source through a resistor 216. The resistor 216 may have a resistance of 1 kilo-ohm. The collector is also connected to a grounded by-passing capacitor 218, the capacitor having a capacity, for example, of .001 microfarad.

The emitter of the transistor 206 is connected to the cathode of the discharge device 202, and its collector is connected to the junction of the resistor 210 and resistor 212. The anode of the discharge device 202 is connected through a 4.7 kilo-ohm resistor 220 to the positive terminal of a 150 volt direct voltage source. The screen grid of the discharge device is connected to that source through a 51 kilo-ohm resistor 224. A capacitor 226 of, for example, .33 microfarad, is connected to the screen grid and to the cathode of the discharge device 202.

The anode of the discharge device 202 is coupled through a coupling capacitor 230 to the control grid of a triode 232. The coupling capacitor 230 may have a capacity, for example, of .022 microfarad. The triode 232 is connected as a cathode follower. Its anode is connected directly to the positive terminal of the 150 volt source, and its cathode is connected to a grounded 6.26 kilo-ohm resistor 234. A 220 kilo-ohm resistor 236 is connected to the control grid and to the cathode of the triode 232.

The output signal from the cathode follower 232 is coupled through a .22 microfarad capacitor 240 to the base of a transistor 242. The base of the transistor is connected through a 39 kilo-ohm resistor 244 to the negative terminal of the 12.6 volt source.

The transistor 242 is an NPN transistor, and may be of the type designated 2N1613. The transistor is connected as an emitter follower. Its collector is connected through a resistor 246 to the positive terminal of the 12.6 volt source, and to a grounded capacitor 248. The resistor 246 may have a resistance of 680 ohms, and the capacitor may have a capacity of 100 microfarads. A resistor 250 of 9.1 kilo-ohms is connected between the collector and base of the transistor 242.

The emitter of the transistor is connected through a 91 ohm resistor 252 to the output terminal 254 of the system. The emitter is also connected through a 1.2 kilo-ohm resistor 256 to the negative terminal of the 12.6 volt direct current voltage source. The resistors 244, 246, 250 and 256 have selected values to bias the transistor 242 in its linear (active) region.

Since the signal applied to the input terminal A of the differential amplifier is introduced to the control grid of the discharge device 202, and since the signal applied to the input terminal B is introduced through the Darlington circuit of the transistors 204 and 206 to drive the cathode, the discharge device 202 functions to amplify the difference between the two signals, in differential amplifier manner. The resulting amplifier signal, appearing at the anode circuit of the discharge device 202 is passed through the cathode follower 232 to a power amplifier stage including the transistor 242. The resulting output signals appear at the output terminal 254.

The invention provides, therefore, an improved equalizer circuit and system which is particularly advantageous in that is incorporates adjustable means for compensating for spurious phase shift in the high frequency components of the signals to be reproduced by the system in which the equalizer is incorporated.

While a particular embodiment of the invention has been shown and described, modifications may be made. It is intended in the following claims to cover all modifications which fall within the spirit and scope of the invention.

What is claimed is:

1. A tape reproduce system having improved compensation for phase displacements, comprising: a signal reproduce head; an equalizer circuit including a delay circuit having an input terminal, an output terminal and an intermediate terminal; means coupling said reproduce head to said input terminal of said delay circuit for introducing an input signal to said delay circuit; a variable impedance means bridging said input and output terminals of said delay circuit for adjustably compensating for phase displacements of the high frequency signals from said reproduce head; and an output circuit coupled to said impedance means and to said intermediate tap of said delay circuit for producing an output signal in response to said input signal said output signal having an essentially uniform high frequency response characteristic.

2. The equalizer circuit defined in claim 1 and which includes a terminating impedance connected to said output terminal of said delay circuit, said terminating impedance having an impedance value corresponding to the impedance of said delay circuit as seen from said output terminal thereof.

3. A tape reproduce system having improved compensation for phase displacements, comprising; a signal reproduce head; and equalizer circuit including a delay circuit having an input terminal, an output terminal and an intermediate tap; means coupling said reproduce head to said input terminal of said delay circuit for introducing an input signal to said delay circuit; a variable voltage divider bridged across said input and output terminals of said delay circuit and having an intermediate voltage tap for adjustably compensating for phase displacements of the high frequency signals from said reproduce head; and a differential amplifier coupled to said intermediate voltage tap of said potentiometer and to said intermediate top of said delay circuit for producing an output signal in response to said input signal, said output signal having an essentially uniform high frequency response characteristic.

4. The equalizer circuit defined in claim 3 in which said intermediate tap is a center tap.

5. The equalizer circuit defined in claim 3 in which said voltage divider includes a potentiometer, and in which said intermediate tap comprises a movable wiper arm for said potentiometer.

6. The equalizer circuit defined in claim 3 and which includes terminating impedance means connected to said output terminal of said delay circuit, said terminating impedance means having an impedance value substantially equal to the impedance of said delay circuit as seen from said output terminal thereof.

7. A tape reproduce system having improved compensation for phase displacements, comprising: a signal reproduce head; an equalizer circuit including a differential amplifier having a first input terminal and a second input terminal; a delay circuit having an input terminal, a center tap and an output terminal; means coupling said reproduce head to said input terminal of said delay circuit for introducing an input signal to said delay circuit; a potentiometer connected across said input and output terminals of said delay circuit and having a movable wiper arm connected to said first input terminal of said differential amplifier for adjustably compensating for phase displacements of the high frequency signals from said reproduce head; circuit means connecting said center tap of said delay circuit to said second input terminal of said differential amplifier; and terminating impedance means connected to said output terminal of said delay circuit, said output signal having an essentially uniform high frequency response characteristic.

8. The equalizer circuit defined in claim 7 in which the impedance of said delay circuit as seen from said output terminal thereof is substantially equal to the value of the impedance of said terminating impedance means.

References Cited

UNITED STATES PATENTS

| | | | |
|---|---|---|---|
| 2,524,761 | 10/1950 | Brown | 333—29 X |
| 3,209,286 | 9/1965 | Eveleth | 333—29 X |

BERNARD KONICK, *Primary Examiner.*

J. RUSSELL GOUDEAU, *Assistant Examiner.*

U.S. Cl. X.R.

330—69; 333—29